Jan. 10, 1928.  1,655,783
R. GALLOIS
ELECTRODE FOR THE COMBINED THERAPEUTIC APPLICATION OF HIGH
FREQUENCY CURRENT AND OF ULTRA VIOLET RADIATION
Filed Sept. 14. 1926
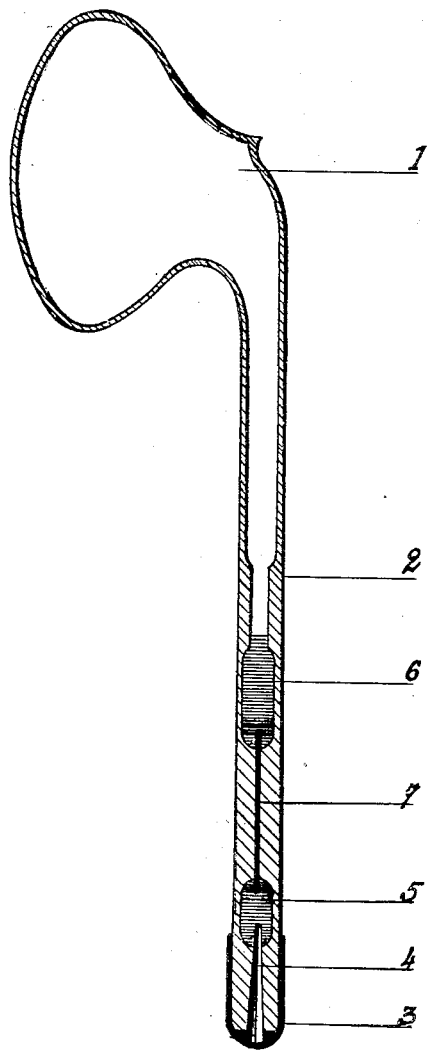
Inventor
R. Gallois
By Langner, Parry, Card & Langner
Att'ys.

Patented Jan. 10, 1928.

1,655,783

UNITED STATES PATENT OFFICE.

ROBERT GALLOIS, OF LYON, FRANCE.

ELECTRODE FOR THE COMBINED THERAPEUTIC APPLICATION OF HIGH-FREQUENCY CURRENT AND OF ULTRA-VIOLET RADIATION.

Application filed September 14, 1926, Serial No. 135,428, and in France October 3, 1925.

Electrodes at present utilized for the therapeutic application of high-frequency currents are composed of tubular glass bodies or members which are sealed when, after exhaustion, they contain only low pressure air.

One of the extremities of these electrodes has a shape which varies according to the part of the body to be treated; the opposite extremity is shaped in such a way as to receive a metallic cap connected to one of the poles of the apparatus generating the high frequency currents, the other pole of which is connected to earth. In these conditions, the electrode is supplied by induction and it is sufficient to touch the patient with it in order that it may be illuminated.

According to the present invention, the electrode composed of transparent fused quartz contains an atmosphere of inert gas (argon, helium or neon) and a small quantity of mercury.

The presence of a gas such as argon, helium or neon in the electrode has for object to facilitate its lighting up. As soon as that has taken place, the tension of the mercury vapor increasing, the electrode works like a mercury-vapor lamp and it emits intense ultra-violet rays.

Silica being transparent to these rays, the physician can thus combine sparking with ultra-violet therapy. The surface of the electrode is sterilized in a continuous and automatic manner by the ultra-violet rays which pass therethrough. Moreover, the quartz being refractory, it is possible, in case of need, to sterilize the electrode in a flame without risk of causing the electrode to break.

Since quartz presents a dielectric coefficient very much higher than that of glass, the electrode offers less risk of perforation than do glass electrodes.

The annexed drawing represents, by way of example, in longitudinal section, one form of constructing the electrode according to the invention.

1 is a hollow body of transparent fused silica, of a shape suited to that portion of the (human) body to be treated, and which is sealed after a high vacuum has been formed therein and of helium, argon or neon has been introduced thereinto. This hollow body ends in a cylindrical shank 2 of reduced diameter which is fitted at its extremity with the metallic cap 3. This latter is provided interiorly and axially, with a metal rod 4, preferably of invar metal, forming a ground joint inside a central passage in the tube 2.

This rod terminates within a chamber 5 formed in the said tube, which chamber contains mercury in electrical communication with another small quantity of mercury 6 free in the container 1, by means of a wire 7 sealed in the axis of the mass of quartz by means of a narrowing of the bore of the tube 2.

This arrangement for leading in the current allows the energy given off by the electrode to be considerably increased.

The invention is obviously not limited to the shape and to the details presented. In particular, for certain applications, the electrode can be composed of a plain tube of silica not comprising a sealing up and simply capped with a metal cap as usual, but always containing essentially a drop of mercury and the gases above specified.

What I claim is:

An electrode intended for the therapeutic application of high frequency currents, comprising a hollow body of transparent fused silica, containing a rarefied inert gas together with a small quantity of mercury, and electric connecting means on said body.

In testimony whereof I have signed my name to this specification.

ROBERT GALLOIS.